(12) United States Patent
Miyazaki (10) Patent No.: US 11,738,602 B2
(45) Date of Patent: Aug. 29, 2023

(54) PNEUMATIC TIRE

(71) Applicant: Toyo Tire Corporation, Itami (JP)

(72) Inventor: Tetsuji Miyazaki, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 0 days.

(21) Appl. No.: 17/387,439

(22) Filed: Jul. 28, 2021

(65) Prior Publication Data

US 2022/0048333 A1 Feb. 17, 2022

(30) Foreign Application Priority Data

Aug. 17, 2020 (JP) .................................. 2020-137635

(51) Int. Cl.
*B60C 11/03* (2006.01)
*B60C 11/12* (2006.01)

(52) U.S. Cl.
CPC ...... *B60C 11/0304* (2013.01); *B60C 11/0302* (2013.01); *B60C 11/1204* (2013.01); *B60C 11/1236* (2013.01); *B60C 11/1263* (2013.01); *B60C 11/1281* (2013.01)

(58) Field of Classification Search
CPC ............. B60C 11/0304; B60C 11/0302; B60C 11/1204; B60C 11/1236; B60C 11/1263; B60C 11/1281; B60C 11/11; B60C 11/0306
See application file for complete search history.

(56) References Cited

U.S. PATENT DOCUMENTS

| 2012/0118455 | A1 | 5/2012 | Hada |
| 2018/0001710 | A1* | 1/2018 | Fujioka ............... B60C 11/1369 |
| 2018/0339556 | A1* | 11/2018 | Mizushima ......... B60C 11/1236 |

FOREIGN PATENT DOCUMENTS

| JP | 2005297695 A | * | 10/2005 |
| JP | 2006240456 A | * | 9/2006 |
| JP | 2012-101758 A | | 5/2012 |

OTHER PUBLICATIONS

Ochi, English Machine Translation of JP 2005297695, 2005 (Year: 2005).*
Ochi, English Machine Translation of JP 2006240456, 2006 (Year: 2006).*

* cited by examiner

*Primary Examiner* — Robert C Dye
*Assistant Examiner* — Brendon Charles Darby
(74) *Attorney, Agent, or Firm* — WHDA, LLP (57) ABSTRACT

A pneumatic tire includes: a first and second main grooves extending in a tire circumferential direction; first and second inclined grooves extending obliquely toward the same side with respect to the tire circumferential direction and connected to the first and second main grooves; and a block defined by the first and second main grooves and the first and second inclined grooves. The block includes a sub groove having a first portion and a second portion, the first portion being open to an intermediate portion of the first inclined groove and extending in the tire circumferential direction, the second portion being inclined to a side opposite to the first inclined groove, extending from a terminal end of the first portion in a direction away from the first inclined groove, and being open to the first main groove.

9 Claims, 5 Drawing Sheets

PNEUMATIC TIRE

BACKGROUND OF THE INVENTION

Field of the Invention

The present disclosure relates to a pneumatic tire.

Description of the Related Art

Conventionally, there has been known a pneumatic tire that includes a longitudinal groove extending in a tire circumferential direction and a lateral groove extending obliquely with respect to the tire circumferential direction and intersecting with the longitudinal groove (e.g., Patent Document 1). In the pneumatic tire, the longitudinal grooves and the lateral grooves guide water interposed between the road surface and the tread to the outside in a tire width direction, so that drainage properties can be improved.

However, depending on the direction and position in which the longitudinal grooves and the lateral grooves are formed, not only the drainage properties cannot be sufficiently improved, but also the rigidity of a block defined by the longitudinal grooves and the lateral grooves is insufficient, and the steering stability deteriorates.

PRIOR ART DOCUMENT

Patent Document

Patent Document 1: JP-A-2012-101758

SUMMARY OF THE INVENTION

An object of the present disclosure is to provide a pneumatic tire capable of improving drainage properties while maintaining block rigidity.

A pneumatic tire according to the present disclosure includes: a first and second main grooves extending in a tire circumferential direction; first and second inclined grooves extending obliquely toward the same side with respect to the tire circumferential direction and connected to the first and second main grooves; and a block defined by the first and second main grooves and the first and second inclined grooves. The block includes a sub groove having a first portion and a second portion, the first portion being open to an intermediate portion of the first inclined groove and extending in the tire circumferential direction, the second portion being inclined to a side opposite to the first inclined groove, extending from a terminal end of the first portion in a direction away from the first inclined groove, and being open to the first main groove.

DETAILED DESCRIPTION OF THE PREFERRED EMBODIMENTS

Hereinafter, an embodiment of a pneumatic tire will be described with reference to FIGS. 1 to 3. Note that a dimensional ratio of the drawing does not necessarily coincide with an actual dimensional ratio in each of the drawings, and dimensional ratios in the respective drawings do not necessarily coincide with each other.

In each of the drawings, a first direction D1 is a tire width direction D1 parallel to a tire rotation shaft that is a rotation center of a pneumatic tire (hereinafter, also simply referred to as a "tire") 1, a second direction D2 is a tire radial direction D2 being a diameter direction of the tire 1, and a third direction D3 is a tire circumferential direction D3 around the tire rotation shaft.

In the tire width direction D1, the inner side is a side close to a tire equatorial plane S1, and the outer side is a side far from the tire equatorial plane S1. In the tire width direction D1, a first side D11 is also referred to as a first width direction side D11, and a second side D12 is also referred to as a second width direction side D12. In the tire radial direction D2, the inner side is a side close to the tire rotation shaft, and the outer side is a side far from the tire rotation shaft.

The tire equatorial plane S1 is a plane orthogonal to the tire rotation shaft and located at the center of the tire 1 in the tire width direction D1, and the tire meridian plane is a plane including the tire rotation shaft and orthogonal to the tire equatorial plane S1. The tire equator line is a line along which an outer surface (a tread surface 2a to be described later) of the tire 1 in the tire radial direction D2 intersects with the tire equatorial plane S1.

Figure 1:
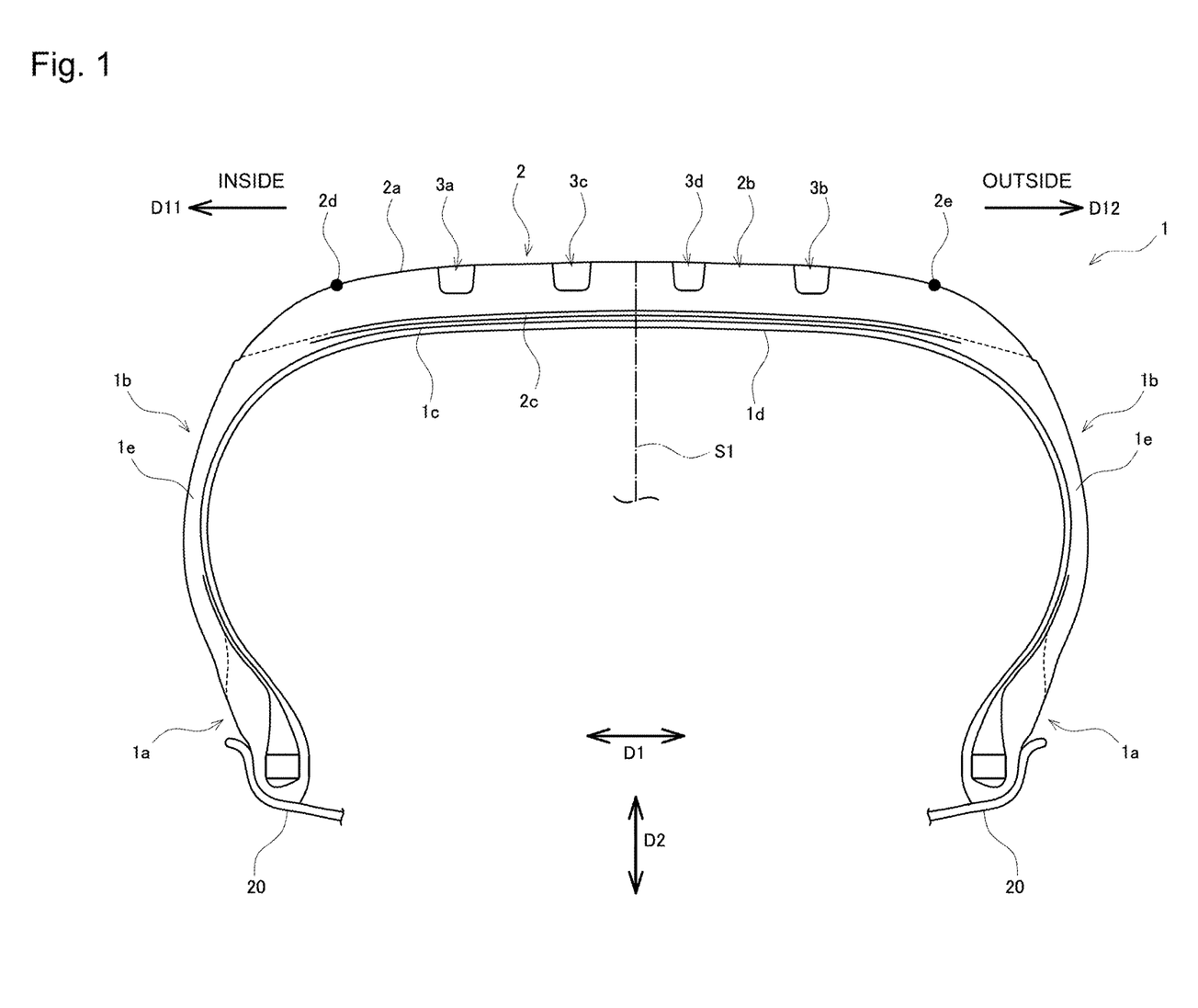
FIG. 1 is a cross-sectional view of a main part of a pneumatic tire according to an embodiment on a tire meridian plane.

As illustrated in FIG. 1, a tire 1 according to the present embodiment includes a pair of beads 1a having a bead core, sidewalls 1b extending outward in the tire radial direction D2 from the respective beads 1a, and a tread 2 connected to the outer ends of the pair of sidewalls 1b in the tire radial direction D2 and having the outer surface in the tire radial direction D2 which is in contact with a road surface. In the present embodiment, the tire 1 is a pneumatic tire 1, in which air is introduced, and is mounted on a rim 20.

Further, the tire 1 includes a carcass 1c stretched between a pair of bead cores, and an inner liner 1d disposed inside the carcass 1c and having an excellent function of preventing permeation of gas in order to maintain the air pressure. The carcass 1c and the inner liner 1d are disposed along the tire inner circumference over the bead 1a, the sidewall 1b, and the tread 2.

The tire 1 has a structure asymmetric with respect to the tire equatorial plane S1. In the present embodiment, the tire 1 is a tire for which the following are designated: a direction in which the tire is mounted on the vehicle; and which of the right and left sides of the tire 1 faces the vehicle at the time of mounting on the rim 20. Note that a tread pattern formed on the tread surface 2a of the tread 2 has a shape asymmetric with respect to the tire equatorial plane S1.

The direction of the mounting on the vehicle is displayed on the sidewall 1b. Specifically, the sidewall 1b includes a sidewall rubber 1e disposed outside the carcass 1c in the tire width direction D1 so as to constitute a tire outer surface, and the sidewall rubber 1e has a display portion (not illustrated) that displays the direction of the mounting on the vehicle on the surface.

For example, one sidewall 1b disposed on the inner side (hereinafter also referred to as "vehicle inner side") during the mounting on the vehicle has a display (e.g., "INSIDE", etc.) indicating the vehicle inner side. Further, for example, the other sidewall 1b disposed on the outer side (hereinafter also referred to as "vehicle outer side") during the mounting on the vehicle has a display (e.g., "OUTSIDE", etc.) indicating the vehicle outer side. In the present embodiment, the first width direction side D11 is the vehicle inner side, and the second width direction side D12 is the vehicle outer side.

The tread 2 includes a tread rubber 2b having a tread surface 2a being in contact with the road surface, and a belt 2c disposed between the tread rubber 2b and the carcass 1c. The tread surface 2a has a ground-contacting surface that is actually in contact with the road surface, and the outer ends of the ground-contacting surface in the tire width direction D1 are referred to as ground-contacting ends 2d, 2e. Note that the ground-contacting surface refers to a tread surface 2a that is in contact with a flat load surface when the tire 1 is mounted on the normal rim 20, the tire 1 is placed perpendicularly to the road surface in a state where the tire 1 is filled with a normal internal pressure, and a normal load is applied.

In a standard system including a standard on which the tire 1 is based, the normal rim 20 is a rim 20 defined for each tire 1 by the standard and is, for example, a standard rim in the case of the Japan Automobile Tyre Manufacturers Association (JATMA), "Design Rim" in the case of the Tire and Rim Association, Inc. (TRA), or "Measuring Rim" in the case of the European Tyre and Rim Technical Organisation (ETRTO).

The normal internal pressure is an air pressure defined for each tire 1 by each standard in the standard system including the standard on which the tire 1 is based. The normal internal pressure is the maximum air pressure in the case of JATMA, the maximum value described in Table "TIRE LOAD LIMITS AT VARIOUS COLD INFLATION PRESSURES" in the case of TRA, and "INFLATION PRESSURE" in the case of ETRTO, and when the tire 1 is for a passenger car, the normal internal pressure is set to 180 kPa.

The normal load is a load defined for each tire 1 by each standard in the standard system including the standard on which the tire 1 is based. The normal load is the maximum load capacity in the case of JATMA, the maximum value described in the above table in the case of TRA, and "LOAD CAPACITY" in the case of ETRTO, and when the tire 1 is for a passenger car, the normal load is 85% of the corresponding load of the internal pressure of 180 kPa.

Figure 2:
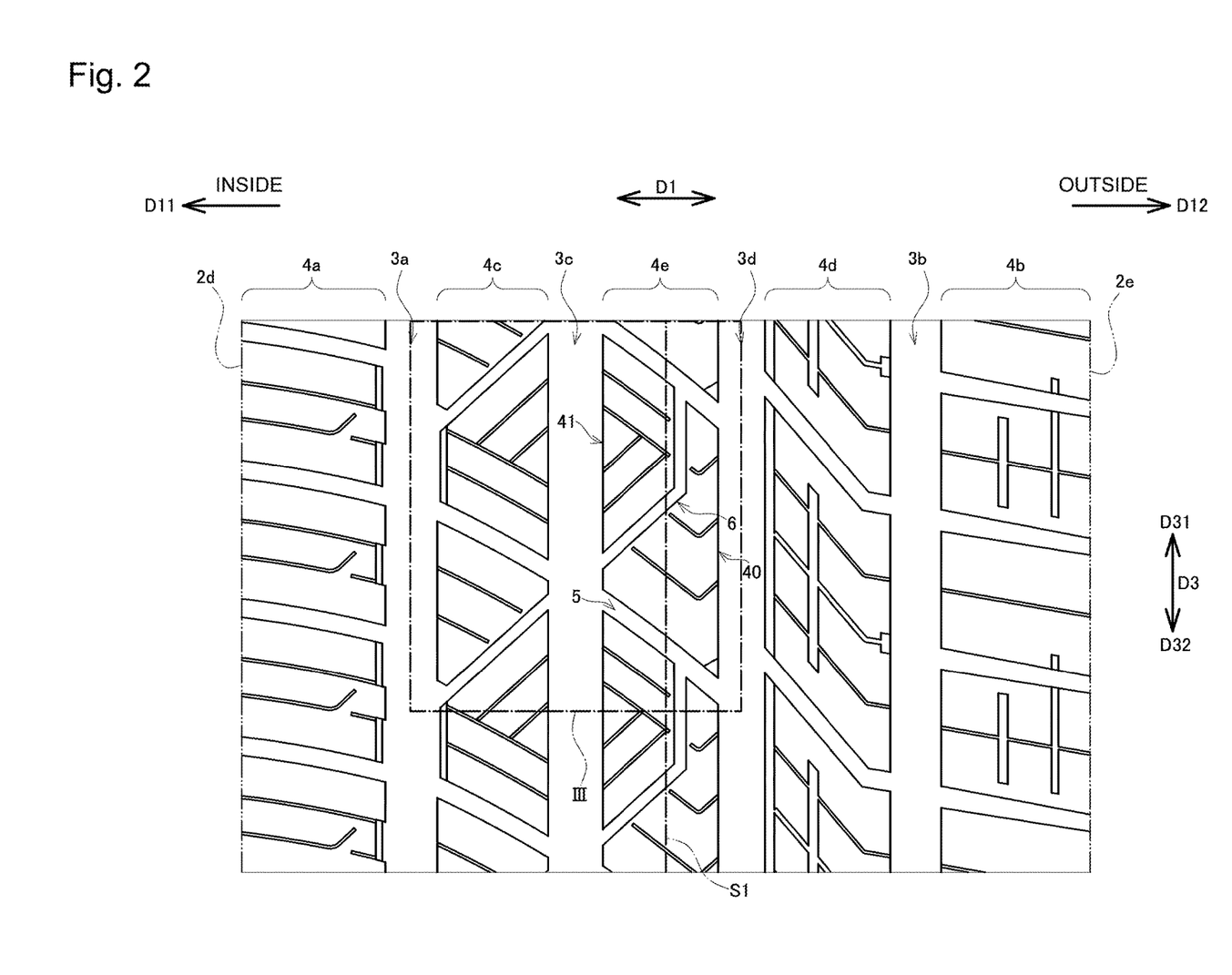
FIG. 2 is a developed view of a main part of a tread surface of the pneumatic tire according to the embodiment.
Figure 3:
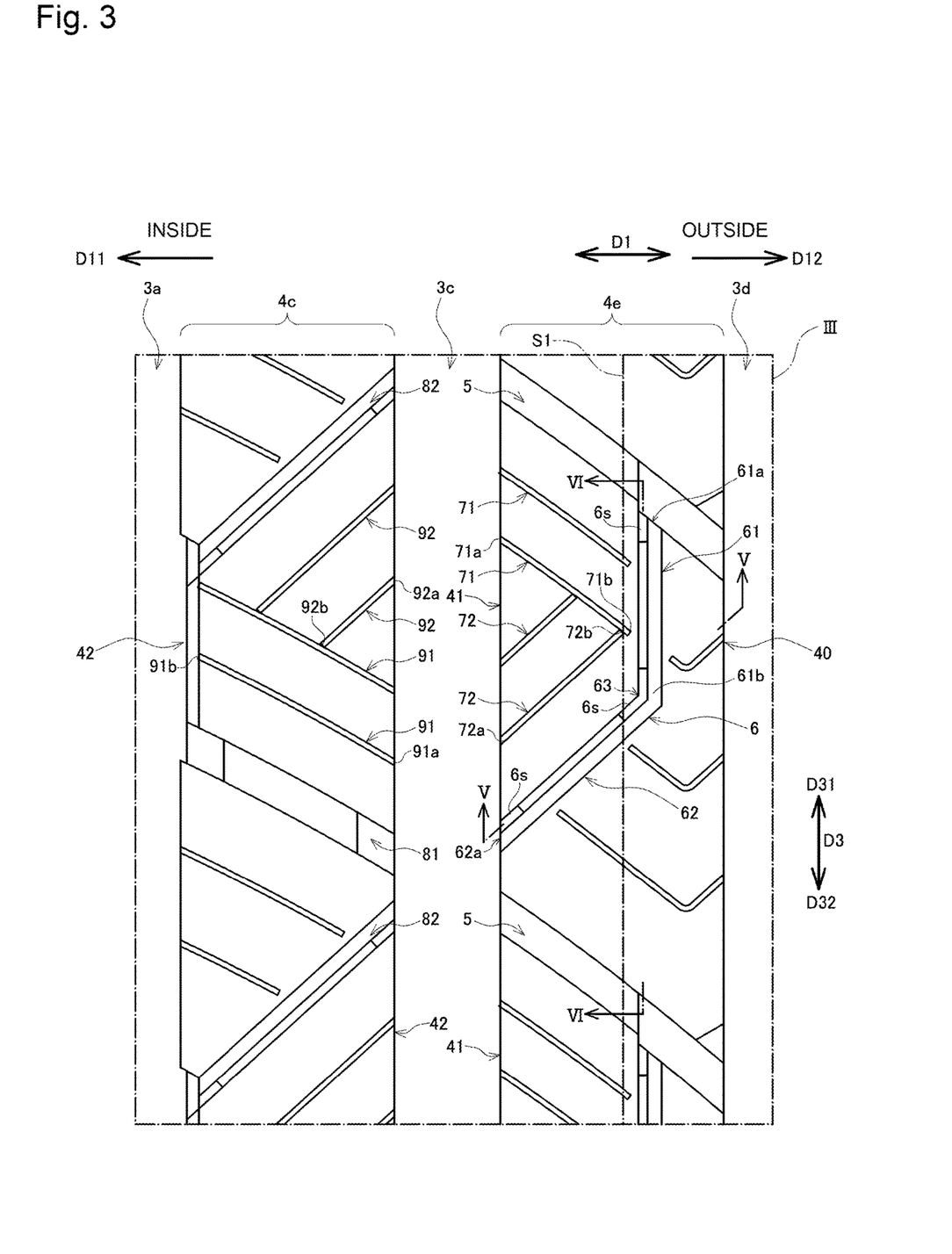
FIG. 3 is an enlarged view of a region III of the tread surface illustrated in FIG. 2.

As illustrated in FIGS. 1 and 2, the tread rubber 2b includes a plurality of main grooves 3a to 3d extending in the tire circumferential direction D3. The main grooves 3a to 3d extend continuously in the tire circumferential direction D3. In the present embodiment, the main grooves 3a to 3d extend in a straight shape along the tire circumferential direction D3, but the present invention is not limited to such a configuration. For example, at least one main groove may extend in a zigzag shape by repeating refraction, or for example, at least one main groove may extend in a wave shape by repeating curvature.

The main grooves 3a to 3d may include, for example, a portion that is a so-called tread wear indicator (not illustrated) where the groove has been made shallow such that the degree of wear can be seen by exposure accompanied by wear. For example, the main grooves 3a to 3d may have a groove width of 3% or more of the distance (dimension in the tire width direction D1) between the ground-contacting ends 2d, 2e. For example, the main grooves 3a to 3d may have a groove width of 5 mm or more.

The pair of main grooves 3a, 3b disposed on the outermost side in the tire width direction D1 is referred to as shoulder main grooves 3a, 3b, and the main grooves 3c, 3d disposed between the pair of shoulder main grooves 3a, 3b are referred to as center main grooves 3c, 3d. Although the number of the main grooves 3a to 3d is not particularly limited, the number is four in the present embodiment.

The tread rubber 2b includes a plurality of lands 4a to 4e defined by the plurality of main grooves 3a to 3d and the pair of ground-contacting ends 2d, 2e. Although the number of the lands 4a to 4e is not particularly limited, but the number is five in the present embodiment.

The lands 4a, 4b defined by the shoulder main grooves 3a, 3b and the ground-contacting ends 2d, 2e are referred to as shoulder lands 4a, 4b, and the lands 4c to 4e defined by the pair of adjacent main grooves 3a to 3d are referred to as middle lands 4c to 4e. Note that the lands 4c, 4d defined by the shoulder main grooves 3a, 3b and the center main grooves 3c, 3d are also referred to as quarter lands (also referred to as "mediate lands") 4c and 4d, and the land 4e defined by the pair of center main grooves 3c, 3d is also referred to as a center land 4e.

The center land 4e has a plurality of inclined grooves 5 extending obliquely toward the same side with respect to the tire circumferential direction D3. The inclined groove 5 is connected to the main groove 3c and the main groove 3d and is open to the main groove 3c and the main groove 3d. Thereby, the center land 4e has a plurality of center blocks 40 divided by the inclined groove 5. It can also be said that the center block 40 is defined by the main groove 3c, the main groove 3d, and the two inclined grooves 5. The groove width of the inclined groove 5 is, for example, 2 to 6 mm, and the groove width of the inclined groove 5 of the present embodiment is 3.5 mm. The groove depth of the inclined groove 5 is, for example, 5 to 10 mm, and the groove depth of the inclined groove 5 of the present embodiment is 7 mm.

Figure 4:
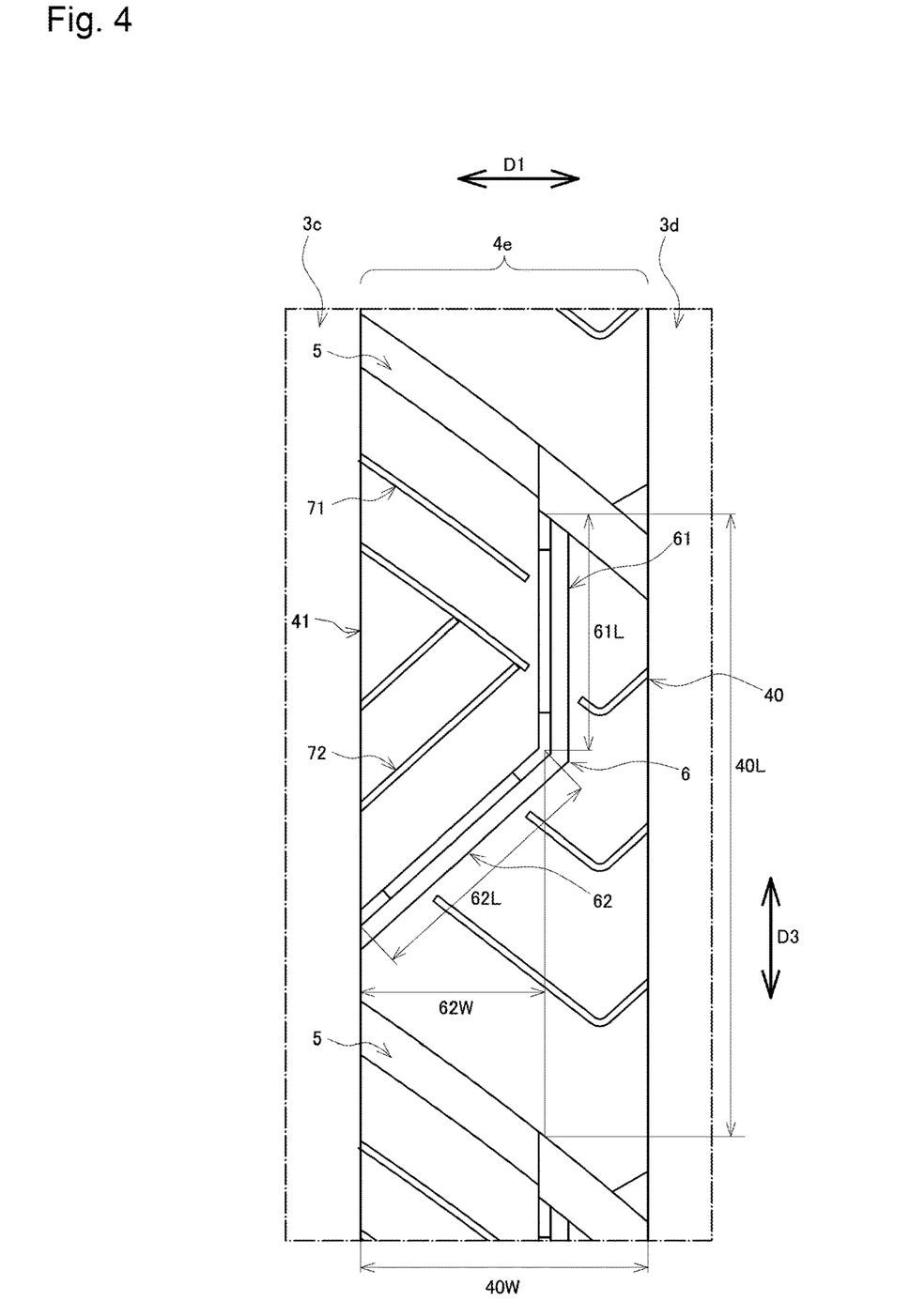
FIG. 4 is an enlarged view of a center block.

The center block 40 includes a sub groove 6. The sub groove 6 includes a first portion 61 extending in the tire circumferential direction D3 and a second portion 62 extending obliquely with respect to the tire circumferential direction D3.

The first portion 61 is open, at a first opening 61a, to an intermediate portion of the inclined groove 5 on a first circumferential direction side D31 out of the two inclined grooves 5 defining the center block 40. The first portion 61 extends from the first opening 61a to a second circumferential direction side D32 and terminates at a terminal end 61b in the center block 40. The first portion 61 is located on the second width direction side D12 with respect to the tire equatorial plane S1 in the tire width direction D1. By shifting the first portion 61 extending in the tire circumferential direction D3 from the tire equatorial plane S1, responsiveness to steering wheel operation is less likely to be adversely affected.

The second portion 62 extends obliquely toward the side opposite to the inclined groove 5 with respect to the tire circumferential direction D3. In addition, the second portion 62 extends in a direction away from the inclined groove 5 on the first circumferential direction side D31 (a direction approaching the inclined groove 5 on the second circumferential direction side D32) from the terminal end 61b of the first portion 61 and is open to the main groove 3c at the second opening 62a. The second portion 62 extends across the tire equatorial plane S1.

Since the sub groove 6 is open only to one inclined groove 5 of the two inclined grooves 5 defining the center block 40 and not configured to completely penetrate the center block 40 in the tire circumferential direction D3 to be divided in the tire width direction D1, the drainage properties can be improved while the block rigidity of the center block 40 is maintained. In addition, since the inclined groove 5 and the second portion 62 of the sub groove 6 each extend obliquely to the opposite sides and are open to the main groove 3$c$, it is possible to obtain drainage properties independent of the rotation direction.

Figure 5:
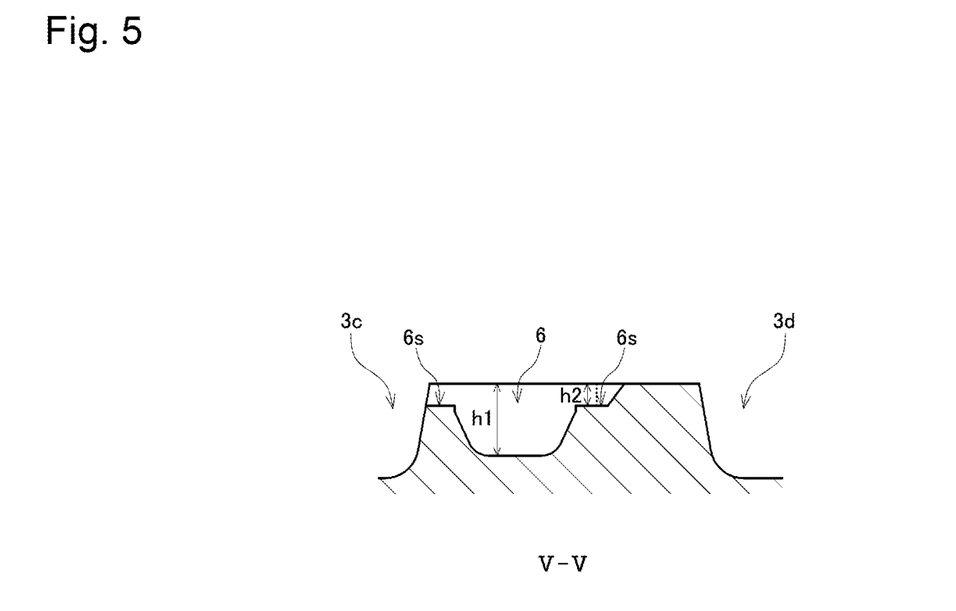
FIG. 5 is a cross-sectional view taken along a line V-V of the tread surface illustrated in FIG. 3.
Figure 6:
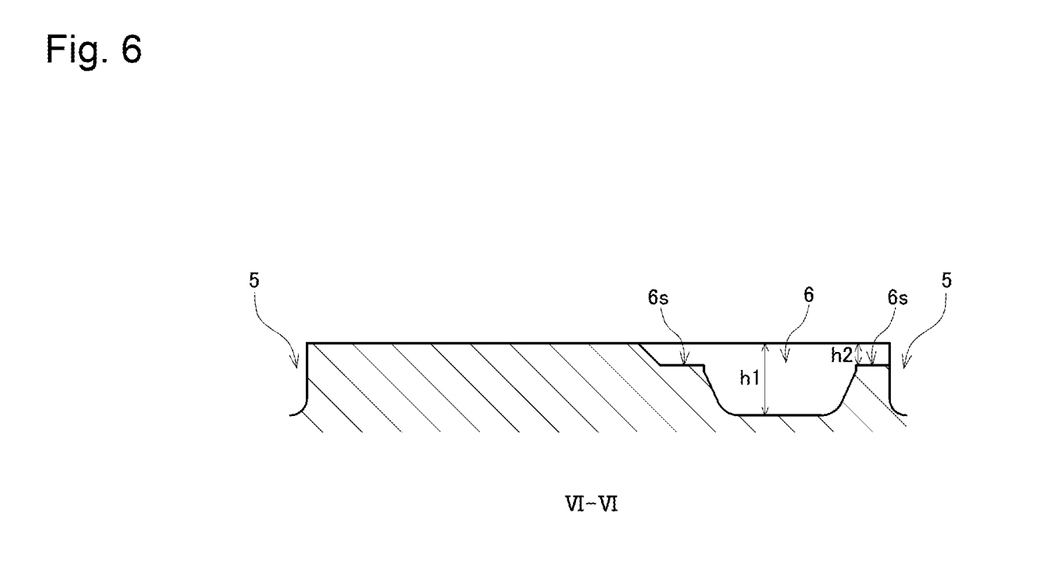
FIG. 6 is a cross-sectional view taken along a line VI-VI of the tread surface illustrated in FIG. 3.

The groove depth h1 of the sub groove 6 is not particularly limited but is preferably smaller than the groove depths of the main grooves 3$a$ to 3$d$ and approximately equal to the groove depth of the inclined groove 5 and is, for example, 1.8 to 4 mm. The groove depth h1 of the sub groove 6 of the present embodiment is 6.5 mm. The sub groove 6 has a bottom raised portion 6$s$ having a depth h2 smaller than the groove depth h1. The depth h2 is preferably 2 mm or more smaller than the groove depth h1. The depth h2 of the bottom raised portion 6$s$ of the present embodiment is 2.0 mm.

The bottom raised portion 6$s$ is provided in a bent portion 63 where the first portion 61 and the second portion 62 are connected, the first opening 61$a$ where the first portion 61 is open to the inclined groove 5, or the second opening 62$a$ where the second portion 62 is open to the main groove 3$c$. By providing the bottom raised portion 6$s$ in the bent portion 63, the first opening 61$a$, or the second opening 62$a$, it is possible to prevent the sub groove 6 from being closed at each of these places upon contact of the tire with the ground and to ensure the drainage properties.

The groove width of the first portion 61 is, for example, 1.8 to 4 mm, and the groove width of the first portion 61 of the present embodiment is 2.5 mm. The groove width of the second portion 62 is, for example, 1.8 to 4 mm, and the groove width of the second portion 62 of the present embodiment is 2.5 mm.

A length 62L of the second portion 62 is preferably larger than a length 61L of the first portion 61. This prevents the trapezoidal block 41 to be described later from becoming excessively small, so that the block rigidity of the trapezoidal block 41 can be ensured, and furthermore, the block rigidity of the center block 40 can be ensured.

The length 61L of the first portion 61 in the tire circumferential direction D3 is preferably 50% or less of a length 40L of the center block 40 in the tire circumferential direction D3. This prevents the trapezoidal block 41 to be described later from becoming excessively small, so that the block rigidity of the trapezoidal block 41 can be ensured, and furthermore, the block rigidity of the center block 40 can be ensured. Note that the length 40L of the center block 40 is the length of the center block 40 on a straight line passing through the first portion 61.

A length 62W of the second portion 62 in the tire width direction D1 preferably exceeds 50% of a length 40W of the center block 40 in the tire width direction D1. This prevents the trapezoidal block 41 to be described later from becoming excessively small, so that the block rigidity of the trapezoidal block 41 can be ensured, and furthermore, the block rigidity of the center block 40 can be ensured.

The center block 40 includes a trapezoidal block 41 defined by the main groove 3$c$, the inclined groove 5 on the first circumferential direction side D31, and the sub groove 6. Due to the sub groove 6 having the first portion 61, the block defined by the sub groove 6 has a trapezoidal shape, and it is easy to ensure block rigidity.

The trapezoidal block 41 has a first sipe 71 and a second sipe 72 extending obliquely to opposite sides with respect to the tire width direction D1. The trapezoidal block 41 of the present embodiment has two first sipes 71 and two second sipes 72. The groove width of each of the first sipe 71 and the second sipe 72 is 1 mm or less. In the present specification, the "sipe" means a groove having a width dimension of less than 1.6 mm on the tread surface 2$a$.

The first sipe 71 extends in parallel with the inclined groove 5 and has one end 71$a$ open to the main groove 3$c$ and the other end 71$b$ terminated in the trapezoidal block 41. That is, the other end 71$b$ of the first sipe 71 is separated from the first portion 61 of the sub groove 6. Accordingly, the trapezoidal block 41 is not divided by the first sipe 71, and hence it is possible to ensure the block rigidity of the trapezoidal block 41. Note that "parallel" includes not only the case of being completely parallel but also the case of being substantially parallel with the intersection angle being 5 degrees or less (the same applies hereinafter).

The interval between the first sipe 71 and the inclined groove 5 is substantially the same as the interval between the adjacent first sipes 71. This improves the rigidity balance in the trapezoidal block 41.

The second sipe 72 extends in parallel with the second portion 62 of the sub groove 6 and has one end 72$a$ open to the main groove 3$c$ and the other end 72$b$ terminated in the trapezoidal block 41. That is, the other end 72$b$ of the second sipe 72 is separated from the first portion 61 of the sub groove 6. Accordingly, the trapezoidal block 41 is not divided by the second sipe 72, and hence it is possible to ensure the block rigidity of the trapezoidal block 41.

The interval between the second sipe 72 and the second portion 62 is substantially the same as the interval between the adjacent second sipes 72. This improves the rigidity balance in the trapezoidal block 41.

The other end 72$b$ of the second sipe 72 is butted against the first sipe 71. The other ends 72$b$ of the two second sipes 72 are butted against the other ends 71$b$ and the central portion of the one first sipe 71, respectively. Hence it is possible to prevent a local increase in ground pressure at the other end 72$b$ of the second sipe 72 and to make the ground pressure uniform.

The quarter land 4$c$ has a first lateral groove 81 extending obliquely with respect to the tire width direction D1. The first lateral groove 81 is connected to the main groove 3$a$ and the main groove 3$c$ and is open to the main groove 3$a$ and the main groove 3$c$. The quarter land 4$c$ has a second lateral groove 82 extending obliquely toward the side opposite to the first lateral groove 81 with respect to the tire width direction D1. The second lateral groove 82 is connected to the main groove 3$a$ and the main groove 3$c$ and is open to the main groove 3$a$ and the main groove 3$c$. Thereby, the quarter land 4$c$ has a plurality of trapezoidal quarter blocks 42 divided by the first lateral groove 81 and the second lateral groove 82. It can also be said that the quarter block 42 is defined by the main groove 3$a$, the main groove 3$c$, the first lateral groove 81, and the second lateral groove 82.

The groove width of the first lateral groove 81 is, for example, 2 to 6 mm, and the groove width of the first lateral groove 81 of the present embodiment is 4 mm. The groove depth of the first lateral groove 81 is, for example, 5 to 10 mm, and the groove depth of the first lateral groove 81 of the present embodiment is 7 mm.

The groove width of the second lateral groove 82 is, for example, 1.8 to 4 mm, and the groove width of the second lateral groove 82 of the present embodiment is 2.5 mm. The groove depth of the second lateral groove 82 is, for example, 1.5 to 10 mm, and the groove depth of the second lateral groove 82 of the present embodiment is 6.5 mm.

The quarter block 42 of the present embodiment has two first sipes 91 and two second sipes 92. The groove width of each of the first sipe 91 and the second sipe 92 is 1 mm or less.

The first sipe 91 is not open to the first lateral groove 81. It is thereby possible to prevent a decrease in the rigidity of the quarter block 42 due to the first sipe 91. Specifically, the first sipe 91 extends in parallel with the first lateral groove 81 and has one end 91a open to the main groove 3c and the other end 91b open to the main groove 3a. Note that the first sipe 91 is not necessarily parallel to the first lateral groove 81.

The interval between the first sipe 91 and the first lateral groove 81 is substantially the same as the interval between the adjacent first sipes 91. This improves the rigidity balance in the quarter block 42.

The second sipe 92 is not open to the second lateral groove 82. It is thereby possible to prevent a decrease in the rigidity of the quarter block 42 due to the second sipe 92. Specifically, the second sipe 92 extends in parallel with the second lateral groove 82 and has one end 92a open to the main groove 3c and the other end 92b terminated in the quarter block 42. That is, the other end 92b of the second sipe 92 is separated from the main groove 3a. Note that the second sipe 92 is not necessarily parallel to the second lateral groove 82.

The interval between the second sipe 92 and the second lateral groove 82 is substantially the same as the interval between the adjacent second sipes 92. This improves the rigidity balance in the quarter block 42.

The other end 92b of the second sipe 92 is butted against the first sipe 91. The other ends 92b of the two second sipes 92 are each butted against the central portion of one first sipe 91. Hence it is possible to prevent a local increase in ground pressure at the other end 92b of the second sipe 92 and to make the ground pressure uniform.

As described above, the pneumatic tire (1) according to the present embodiment includes: a first and second main grooves (3c, 3d) extending in a tire circumferential direction (D3); first and second inclined grooves (5, 5) extending obliquely toward the same side with respect to the tire circumferential direction (D3) and connected to the first and second main grooves (3c, 3d); and a block (40) defined by the first and second main grooves (3c, 3d) and the first and second inclined grooves (5, 5). The block (40) includes a sub groove (6) having a first portion (61) and a second portion (62), the first portion (61) being open to an intermediate portion of the first inclined groove (5) and extending in the tire circumferential direction (D3), the second portion (62) being inclined to a side opposite to the first inclined groove (5), extending from a terminal end (61b) of the first portion (61) in a direction away from the first inclined groove (5), and being open to the first main groove (3c).

Since the sub groove (6) is opened only to the first inclined groove (5) of the first and second inclined grooves (5, 5) defining the block (40), the drainage properties can be improved while the block rigidity of the block (40) is maintained. In addition, since the first inclined groove (5) and the second portion (62) of the sub groove (6) extend obliquely to the opposite sides and are open to the first main groove (3c), it is possible to obtain drainage properties independent of the rotation direction. As a result, according to the pneumatic tire (1), it is possible to improve drainage properties while maintaining block rigidity.

Further, as in the present embodiment, the sub groove (6) may include a bent portion (63) to which the first portion (61) and the second portion (62) are connected, a first opening (61a) at which the first portion (61) is open to the first inclined groove (5), and a second opening (62a) in which the second portion (62) is open to the first main groove (3c), and at least one of the bent portion (63), the first opening (61a), and the second opening (62a) may have a bottom raised portion (6s).

With this configuration, upon contact of the tire with the ground, the sub groove (6) is prevented from being closed at the bent portion (63), the first opening (61a), or the second opening (62a), and the drainage properties can be ensured.

Further, as in the present embodiment, the second portion (62) may be longer than the first portion (61).

Further, as in the present embodiment, the length (61L) of the first portion (61) in the tire circumferential direction (D3) may be 50% or less of the length (40L) of the block (40) in the tire circumferential direction (D3).

Further, as in the present embodiment, the length (62W) of the second portion (62) in the tire width direction (D1) may exceed 50% of the length (40W) of the block (40) in the tire width direction (D1).

With these configurations, the trapezoidal block (41) does not become excessively small, so that the block rigidity of the trapezoidal block (41) can be ensured, and furthermore, the block rigidity of the block (40) can be ensured.

Further, as in the present embodiment, the block (40) may include a trapezoidal block (41) defined by the first main groove (3c), the first inclined groove (5), and the sub groove (6), and the trapezoidal block (41) may have a sipe (71, 72) extending in parallel with the first inclined groove (5) or the second portion (62) of the sub groove (6), and the sipes (71, 72) may be separated from the first portion (61) of the sub groove (6).

With this configuration, the block rigidity of the trapezoidal block (41) can be ensured.

Note that the pneumatic tire 1 is not limited to the configuration of the embodiment described above and is not limited to the operation and effect described above. It is needless to say that various modifications can be made to the pneumatic tire 1 within a range not departing from the gist of the present invention. For example, the configuration, the method, and the like of each of the plurality of embodiments described above may be arbitrarily adopted and combined, and it is a matter of course that one or more configurations, methods, and the like according to various modification examples described below may be arbitrarily selected and adopted in the configuration, method, and the like according to the embodiment described above.

In the above embodiment, the first sipe 71 is parallel to the inclined groove 5, and the second sipe 72 is parallel to the second portion 62 of the sub groove 6, but the present invention is not limited thereto. However, from the viewpoint of ensuring the block rigidity of the trapezoidal block 41, the first sipe 71 and the second sipe 72 are preferably separated from the first portion 61 of the sub groove 6.

What is claimed is:

1. A pneumatic tire comprising:
   first and second main grooves extending in a tire circumferential direction;
   first and second inclined grooves extending obliquely toward a same side with respect to the tire circumferential direction and connected to the first and second main grooves; and
   a block defined by the first and second main grooves and the first and second inclined grooves, wherein the block includes a sub groove having a first portion and a second portion, the first portion being open to an intermediate portion of the first inclined groove and extending in the tire circumferential direction, the second portion being inclined to a side opposite to the first inclined groove, extending from a terminal end of the first portion in a direction away from the first inclined groove, and being open to the first main groove, wherein a first direction is one direction along the tire circumferential direction and a second direction is an opposite direction opposite to the first direction along the tire circumferential direction, the second portion is inclined to extend from the terminal end of the first portion toward the first direction to reach the first main groove and the first inclined groove is inclined to extend toward the second direction to reach the first main groove, wherein the width of the first portion and the width of the second portion are equal.

2. The pneumatic tire according to claim 1, wherein the sub groove includes
   a bent portion to which the first portion and the second portion are connected,
   a first opening at which the first portion is open to the first inclined groove, and
   a second opening in which the second portion is open to the first main groove, and
   at least one of the bent portion, the first opening, and the second opening has a bottom raised portion.

3. The pneumatic tire according to claim 1, wherein the second portion is longer than the first portion.

4. The pneumatic tire according to claim 1, wherein a length of the first portion in the tire circumferential direction is 50% or less of a length of the block in the tire circumferential direction.

5. The pneumatic tire according to claim 1, wherein a length of the second portion in a tire width direction exceeds 50% of a length of the block in the tire width direction.

6. The pneumatic tire according to claim 1, wherein the block includes a trapezoidal block defined by the first main groove, the first inclined groove, and the sub groove, and the trapezoidal block has a sipe extending in parallel with the first inclined groove or the second portion of the sub groove, and the sipe is separated from the first portion of the sub groove at one end thereof and open to the first main groove at an opposite end thereof which is opposite to the one end, wherein the sipe is terminated at the opposite end.

7. The pneumatic tire according to claim 6, wherein the sipe extends in parallel with the second portion of the sub groove.

8. A pneumatic tire comprising:
   first and second main grooves extending in a tire circumferential direction;
   first and second inclined grooves extending obliquely toward a same side with respect to the tire circumferential direction and connected to the first and second main grooves; and
   a block defined by the first and second main grooves and the first and second inclined grooves including a tire equatorial plane,
   wherein the block includes a sub groove having a first portion and a second portion, the first portion being open to an intermediate portion of the first inclined groove and extending in the tire circumferential direction, the second portion being inclined to a side opposite to the first inclined groove, extending from a terminal end of the first portion in a direction away from the first inclined groove, and being open to the first main groove,
   wherein a first direction is one direction along the tire circumferential direction and a second direction is an opposite direction opposite to the first direction along the tire circumferential direction,
   the second portion is inclined to extend from the terminal end of the first portion toward the first direction to reach the first main groove and the first inclined groove is inclined to extend toward the second direction to reach the first main groove,
   wherein the first portion is located on one side with respect to the tire equatorial plane in a tire width direction, and
   the second portion extends across the tire equatorial plane toward an opposite side opposite to the one side with respect to the tire equatorial plane in the tire width direction,
   wherein the first main groove is substantially straight along the tire circumferential direction entirely.

9. The pneumatic tire according to claim 8, wherein the width of the first portion and the width of the second portion are equal.

* * * * *